United States Patent
Pitz et al.

(10) Patent No.: US 10,877,457 B2
(45) Date of Patent: Dec. 29, 2020

(54) METHOD FOR PROVIDING A TRAVEL PROFILE, CONTROL DEVICE, MACHINE, AND COMPUTER PROGRAM

(71) Applicant: Siemens Aktiengesellschaft, Munich (DE)

(72) Inventors: Thomas Pitz, Rutesheim (DE); Ralf Spielmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/759,920

(22) PCT Filed: Aug. 24, 2016

(86) PCT No.: PCT/EP2016/069954
§ 371 (c)(1),
(2) Date: Mar. 14, 2018

(87) PCT Pub. No.: WO2017/045884
PCT Pub. Date: Mar. 23, 2017

(65) Prior Publication Data
US 2018/0246490 A1    Aug. 30, 2018

(30) Foreign Application Priority Data
Sep. 15, 2015   (EP) .................................... 15185161

(51) Int. Cl.
*G05B 19/19*   (2006.01)
*G05B 19/4103*   (2006.01)
*G06F 17/14*   (2006.01)

(52) U.S. Cl.
CPC ......... *G05B 19/19* (2013.01); *G05B 19/4103* (2013.01); *G06F 17/148* (2013.01); *G05B 2219/33026* (2013.01); *G05B 2219/34141* (2013.01); *G05B 2219/35012* (2013.01); *G05B 2219/36199* (2013.01); *G05B 2219/42176* (2013.01)

(58) Field of Classification Search
None
See application file for complete search history.

(56) References Cited

U.S. PATENT DOCUMENTS 5,726,896 A * 3/1998 Jia ........................ G06T 11/203
                                                      318/568.13
5,796,618 A * 8/1998 Maeda ............... G05B 19/4097
                                                      700/104
2006/0206234 A1   9/2006 Glaesser

FOREIGN PATENT DOCUMENTS

CN         102901444       1/2013
CN         103063160       4/2013
(Continued)

OTHER PUBLICATIONS

Hamann, "Data point selection for piecewise linear curve approximation", 1994, Computer Aided Geometric Design vol. 11, Issue 3, Jun. 1994, pp. 295-297 (Year: 1994).*

(Continued)

*Primary Examiner* — Mohammad Ali
*Assistant Examiner* — David Earl Ogg
(74) *Attorney, Agent, or Firm* — Cozen O'Connor (57) ABSTRACT

A control device, a machine (tool) having the control device, a method for providing a travel profile and a computer program for providing the travel profile, wherein a reference line is generated, e.g., from a CAD drawing, to provide a travel profile for a tool, where approximation curves are created from the reference line using wavelet base functions, transformation curves are formed from the approximation curves via difference generation, and these are each adapted to a desired accuracy of the processing mode via modification, where modification curves are created via the modification of the transformation curves, where the travel profile is the sum of the modification curves, and where drive elements of the machine tool are controlled based on the (Continued)

travel profile such that the travel profile can be optimized via the selection of wavelet base functions, based on a processing mode, e.g. rough milling, fine milling, laser cutting.

17 Claims, 5 Drawing Sheets

(56) References Cited

FOREIGN PATENT DOCUMENTS

| | | |
|---|---|---|
| CN | 103197598 | 7/2013 |
| JP | 2002-222008 | 8/2002 |
| JP | 2011-204096 | 10/2011 |

OTHER PUBLICATIONS

Narayanaswami, "Multiresolution analysis as an approach for tool path planning in NC machining", 2003, Industrial and Manufacturing Systems Engineering, Iowa State University, pp. 167-177 (Year: 2003).*

Yang, "Control point adjustment for B-spline curve approximation", 2004, Computer-Aided Design 36, pp. 648-349 (Year: 2004).*

Ko et al, "Orthogonal projection of points in CAD/CAM applications: an overview", 2014, Journal of Computational Design and Engineering vol. 1 No. 2, pp. 116-127 (Year: 2014).*

Narayanaswami R. et al.: "Multiresolution analysis as an approach for tool path planning in NC machining"; Computer Aided Design, Elsevier Publishers BV., Barking, GB; Bd. 35; nr. 2; pp. 167-178; XP004383515; ISSN: 0010-4485, DOI:10.1016/SOOI0-4485(02)00050-7; 2003.

Weinert K. et al.: "Optimizing of NC Tool Paths for Five-Axis Milling using Evolutionary Algorithms on Wavelets"; GECC0'06, Seattle, Washington, USA; pp. 1809-1816; XP040043374; DOI: 10.1145/1143997.1144289; ISBN: 1-59593-186-4; 2006.

PCT International Examination Report and Written Opinion of International Examination Authority dated Nov. 7, 2016 corresponding to PCT International Application No. PCT/EP2016/069954 filed Aug. 24, 2016.

Office Action dated Jun. 2, 2020 issued in Chinese Patent Application No. 201680062064.1.

* cited by examiner

METHOD FOR PROVIDING A TRAVEL PROFILE, CONTROL DEVICE, MACHINE, AND COMPUTER PROGRAM

CROSS-REFERENCE TO RELATED APPLICATIONS

This is a U.S. national stage of application No. PCT/EP2016/069954 filed Aug. 24, 2016. Priority of claimed on EP Application No. 15185161 filed Sep. 15, 2016, the content of which is incorporated herein by reference in its entirety.

BACKGROUND OF THE INVENTION

Field of the Invention

The invention relates to a method for providing a travel profile, a control device, a machine comprising a machine tool, and to a computer program.

Description of the Related Art

Typically, a travel profile for a tool is generated to control a machine tool. The travel profile specifies the path along which the tool is moved at a predetermined speed. The starting point for calculating such a path is a technical drawing (CAD file), for instance. Here, what is known as a G-code program, also CNC program or parts program, is generated from the technical drawing. The G-code program predetermines the travel profile of the tool. In most cases, generation of the G-code program is automated in a CAD/CAM/PP system. Here, CAD stands for Computer Aided Design and CAM stands for Computer Aided Manufacturing. PP also stands for Post Processing. The CAD/CAM/PP method is used to create the G-code program that contains a travel profile for a tool for processing the workpiece.

With the aid of a machine tool, in particular a CNC machine, a workpiece can be manufactured with the aid of different processing modes. For instance, a rough removal of the excess material is firstly performed with the aid of the processing mode "rough machining". Furthermore, a machine tool can be used to separate out a metal piece from a larger metal piece using a processing mode "laser cutting process". Different processing modes require different accuracies, can occur at different speeds and can therefore be described via different reference values (such as tolerances or material constants).

The use of a Fourier transform was proposed in order to calculate general travel profiles.

Contrary to a Fourier transform, which transforms a time signal into a frequency signal so that a frequency analysis can occur, a time-frequency analysis, in other words a mixture of analysis in the time range and in the frequency range, is enabled via the wavelet transform.

SUMMARY OF THE INVENTION

It is an object of the invention to enable the calculation of an improved travel profile and to create the travel profile, where the processing mode is taken into account when the travel profile is created.

These and other objects and advantges are achieved in accordance with the invention by a method for providing a travel profile, in particular the travel profile of a tool in a machine tool, where a reference line is predetermined, where the reference line is defined based on points along an edge or a corner of a workpiece, and where at least the following steps A), B), D) and E) or at least the steps C), D) and E) then proceed:

A) creating n approximation curves, where the n approximation curves are created by an approximation based on a different number and/or position of points, in particular from points in the reference line, B) creating n transformation curves, where the transformation curves are each generated by differentiating between two of the n approximation curves in each case, C) creating n transformation curves via wavelet approximations of the reference line, D) creating n modification curves, where the j'th (j=1 ... n) modification curve is generated from the j'th transformation curve via a modification process, and E) creating the travel profile by adding the n modification curves.

A travel profile is understood to mean the curve through which a tool passes when a workpiece is processed. In this regard, the travel profile is to be selected to be as short as possible, so that the shortest possible processing time is adhered to when the speed of the tool is limited. The travel profile depends moreover on a selectable processing mode (laser cutting, rough machining with a cutting tool or fine machining with a tool).

A reference line comprises a quantity of points, which map the edge, where the points lie on a straight line, for instance, which extends orthogonally to an edge on the surface of the workpiece to be manufactured.

A corner is defined here as a junction of at least two edges.

It is also an object of the invention to provide a control device, in particular a control device in a machine tool, where the control device includes a processor and memory and is provided to provision a travel profile, where a reference line, support points and/or a G-code program are provided as input variables and where the disclosed method is provided to provision the travel profile.

It is also an object of the invention to provide a machine, in particular a machine tool, and a computer program.

A travel profile is understood to mean a movement of a tool provided in a machine tool. Here, the travel profile specifies the path through which the tool passes during the course of the processing of a workpiece.

A reference line is understood to mean a curve that extends along a surface of a workpiece. The reference line can advantageously be represented by a finite quantity of points. Here, the points are arranged along the reference line. The reference line is generated from the CAD file. The reference line is defined by way of straight lines and corners of the workpiece shown. A reference line comprises a quantity of points, which map an edge of the workpiece, where the points lie along a straight line, for instance, which extends orthogonally to an edge on the surface of the workpiece to be manufactured.

The approximation curves are created by an approximation from the points of the reference line with the aid of an approximation function. Polynomials, in particular spline functions, or products of polynomials with trigonometric functions are suitable as approximation functions. Such approximation functions may also be wavelet base functions.

The approximation curves serve to approximate the reference line. Depending on the number of points that are used for approximation of the reference line, the approximation curve has a special profile. The approximation curve regularly extends with an increasing number of points closer to the reference line.

Advantageously, the points are arranged equidistantly. By omitting one or more points in each case, and possibly displacing the points to form an equidistant distance, approximation curves can be created based on the points still available depending on the number of omitted points and subsequent approximation of the curve. A first approximation curve with an approximation function is created based on a plurality of points that lie on the reference line to provision n approximation curves. A few points are then removed from the reference line. The second approximation curve appears via an approximation based on the reduced number of points with the approximation curve.

Transformation curves are created from the approximation curves, as shown below. A transformation curve is calculated by subtracting two approximation curves in each case. The first approximation curve is advantageously subtracted from the second approximation curve to create a first transformation curve. In order to calculate the j'th transformation curve, the j'th approximation curve is advantageously subtracted from the (j+1)'th approximation curve. n−1 transformation curves are therefore calculated from n approximation curves. The n'th transformation curve then corresponds to the n'th approximation curve.

Another possibility of calculating transformation curves is a wavelet approximation of the reference line. For this purpose, the reference line is developed in accordance with a wavelet base function. For this purpose, the first transformation curve is calculated by developing the reference line in accordance with the first wavelet base function. The j'th transformation curve is calculated by developing the reference line in accordance with the j'th wavelet base function. In this regard, the development in accordance with a wavelet base function can be understood to be a scalar product of the reference line with the corresponding wavelet base function.

Known functions, such as the Mexican hat function, are used as the wavelet base functions.

The wavelet base function is advantageously selected in accordance with the predetermined processing mode. In such a way, the processing mode is advantageously already taken into account when the travel profile is calculated.

Modification curves are generated from the transformation curves by adjustment to reference values and/or as a function of the processing mode. In this regard the j'th modification curve is produced from the j'th transformation curve via a modification process. The modification process is a smoothing of the transformation curve, for instance. The accuracy involved in manufacturing a workpiece can be influenced via the smoothing.

The modification process, in particular the smoothing, of the transformation curves, is advantageously performed such that via the reference values a maximum deviation of individual points with respect to the further points, for instance, lying on the modification curve, is defined. Points that lie outside of the deviations are displaced such that they once again lie in the region of the permissible deviations. In this regard, the deviations are predetermined by the reference value and/or the processing mode.

The travel profile is the sum of the n modification curves. The travel profile can also be made up by summing modification curves that are considered in a weighted manner. Individual modification curves can also advantageously not be taken into account in the summation.

The travel profile generated by the afore-cited method steps is advantageously stored and made available for a machine tool or a production machine. The travel profile is the curve according to which the tool moves in the machine tool during manufacture of the workpiece.

The reference values, according to which the modification process is aligned, are geared to the accuracy required to manufacture the workpiece. A high accuracy during manufacture of the component results from the minimal modification of the transformation curves, in particular the smoothing, during the modification process. In other words, the smoothing of the transformation curves for achieving the modification curves is all the more significant, the more inaccurately the workpiece is to be manufactured. Advantageously, the processing time is lower with a more significant smoothing, since the travel profile is to be processed over a shorter time.

The disclosed invention makes it possible to calculate travel profiles, according to the processing mode, which no longer have to be changed before the travel profiles can be transferred to the machine tool. Advantageously, the hitherto expensive post processing can therefore be simplified. At the same time, the processing mode provided, such as laser cutting or different CNC manufacturing methods, can be directly taken into account when the travel profile is created. Similarly, required manufacturing accuracies can be ensured when the travel profile is calculated, before the travel profile is transferred to the machine tool/production machine or to a control device in the machine tool or production machine.

In an advantageous embodiment of the method, the approximation curves and/or the transformation curves are wavelet base functions of a wavelet transform.

Polynomials, exponential functions or trigonometric functions as well as series developments of the exponential functions or trigonometric functions can be used to connect the points that are predetermined by the reference line. Approximation functions that only have to be adjusted with a few parameters to connect the points in the reference line are particularly suitable. Wavelet base functions are particularly well suited to tool surfaces with corners, which are shown with a reference line. For instance, a connection of the points using a combination of exponential functions such as a Gaussian function, multiplied by a polynomial and/or a trigonometric function, is particularly suitable.

Rapid and numerically stable calculations of approximation functions and therefrom finally a rapid and simple calculation of a travel profile are possible using wavelet base functions.

In a further advantageous embodiment of the method, the modification process is a smoothing based on a reference value.

A reference value is understood to mean values that are proportional to a predetermined accuracy when the workpiece is manufactured or processed.

A smoothing of a transformation curve is understood to mean that points, the distance of which from an averaged curve is greater than a maximum deviation, are moved toward the averaged curve. The maximum deviation is determined from the reference value and/or the processing mode.

The smoothing of the transformation curves and the creation of modification curves associated therewith enable manufacturing tolerances to be taken directly into account when the travel profile is calculated. The creation of faulty workpieces is therefore effectively prevented and costs are herewith saved during manufacture.

In a further advantageous embodiment of the method, the wavelet base functions are predetermined based on the processing mode.

Different wavelet base functions have different properties with respect to continuity or support. For instance, selecting a non-continuous wavelet base function for a processing mode, such as the laser cutting, can have favorable effects.

Wavelet base functions can serve to approximate the points of the reference line both with method step C) and also with method step B).

For both method steps B) and C) wavelet base functions can advantageously be stored in a library and with the corresponding method step can be selected from this library and provided with the corresponding parameters.

In a further advantageous embodiment of the method, the j'th approximation curve is generated by omitting each i'th, in particular each second, point of the (j−1)'th approximation curve.

When the approximation curve is calculated, the following can advantageously proceed: To calculate the first approximation curve (j=1), the points, which are predetermined by the reference line, are approximated by an approximation function, in particular by a polynomial or a spline function. In order to calculate a second approximation function (j=2), a few points, in particular each second point, are removed from the reference line. The remaining points form the basis for the second approximation function (j=2). The second approximation curve is calculated by approximation of the reduced number of points, in particular with a wavelet base function.

Points are in turn removed from the reference line to calculate the third approximation curve (j=3). Each second point is in turn particularly advantageously removed from the reference line, with which the second approximation function has been approximated. A third approximation curve (j=3) is calculated (approximated) based on the further reduced quantity of points. Further approximation curves (j=4, 5, 6, . . . ) are calculated in accordance with this scheme, by the quantity of points always being further reduced and the reduced quantity of points being the starting point for the approximation curve.

With this calculation method, the same approximation curve, in particular a wavelet base function, can be used to calculate n approximation curves. This advantageously ensures numerical stability of the calculation of the approximation curves and furthermore the calculation of the travel profile.

In a further advantageous embodiment of the method, the approximation curves each result from an approximation of the points via polynomials, in particular B-splines.

A particularly simple numerical calculation and representation of approximation curves is possible via polynomials. Moreover, a simple and rapid calculation rule can be employed by using spline functions, in particular via B-splines.

In a further advantageous embodiment of the method, the j'th transformation curve is formed from the difference of the (k+2)'th approximation curve and the (k+1)'th approximation curve.

The difference between two approximation functions is advantageously formed to calculate a transformation curve. In such cases, the approximation curve, which is produced from the lowest number of points, corresponds to the corresponding transformation curve.

The formation of differences advantageously allows numerical errors to be computationally eliminated when the approximation curves are calculated.

In a further advantageous embodiment of the method, the reference values are predetermined based on the processing mode.

The reference values can be predetermined by the user, or already defined in the calculation as identifying variables of a processing mode. The user then selects only the processing mode and changes the reference values as and when necessary. This takes pressure off the user of the machine tool or the production machine so that he only selects the desired processing mode.

In an advantageous embodiment of the control device, the travel profile is provided to control drive elements in a machine tool. The control device serves to control the drive elements in the machine tool or the production machine. The travel profile of the tool can nowadays likewise be calculated in the control device. A possibly error-prone transfer of the travel profile to the control device is therefore omitted.

The development of the reference line in accordance with the wavelet base functions is advantageously performed with the aid of the fast wavelet transform (FWT). The fast wavelet transform can likewise be used to calculate the transformation curves.

In order to calculate the travel profile, the calculation of the transformation curves can also be performed via a wavelet transform, in particular via a fast wavelet transform. In accordance with an alternative calculation method, the travel profile is calculated based on the following procedure:

Calculating the transformation curves from a wavelet transform of the reference line with wavelet base functions. The selection of the wavelet base functions depends on the processing mode provided.

Modification of the transformation curves in accordance with the afore-cited embodiments is performed in particular by a smoothing based on the predetermined reference values. With modification, in particular via the smoothing, each transformation curve is converted into a modification curve.

The travel profile can advantageously be calculated from the modification curves via a wavelet (back) transform, in particular with the aid of the fast wavelet transform.

The disclosed embodiments of invention are characterized by a particularly efficient calculation of a travel profile for a tool in a machine tool or a production machine. Furthermore, it is possible to dispense with a subsequent adjustment of the travel profile, because the processing mode provided is already predetermined by the user prior to calculating the travel profile.

In addition to the examples cited, the disclosed embodiments of invention can generally be used to calculate travel profiles in a plurality of machines. The field of application in movement tasks for robots is noteworthy. With the calculation of a travel profile for a robot, the reference line is a specification from a handling task, for instance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described and explained below making reference to the figures, in which.

DETAILED DESCRIPTION OF THE EXEMPLARY EMBODIMENTS

Figure 1:
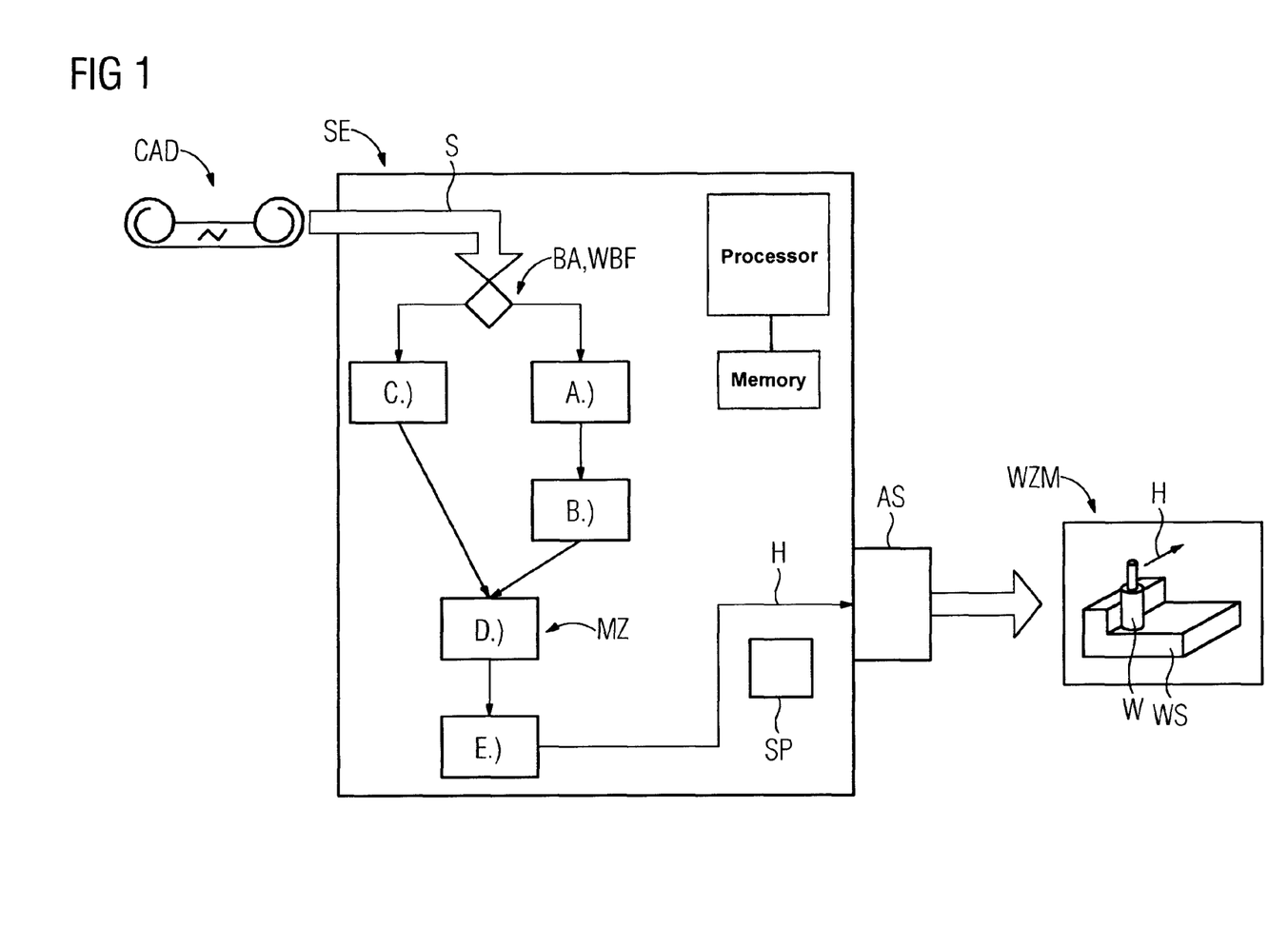
FIG. 1 shows a control device and a machine tool in accordance with the invention.

FIG. 1 shows a control device SE and machine tool WZM. The machine tool WZM has a tool W, where a workpiece WS is manufactured with the aid of the tool W. The tool W is moved along a travel profile H. The movement along the travel profile H of the tool WZ is characterized by an arrow. The tool W is controlled or regulated in terms of its position via a drive controller AS. The drive controller AS is controlled by the control device SE. The drive controller AS is either part of the control device SE or a stand-alone drive controller AS, which can also be assigned to the machine tool WZM.

The control device SE receives a description, in particular a CAD drawing (referred to as CAD in the FIG.) of the workpiece WS to be manufactured. The description CAD can be realized by a parts program, an NC program or a CAD file, for instance.

A reference line S is calculated from the description CAD. The reference line S is converted with the aid of the method cited below to form the travel profile H for the tool W of the machine tool WZM. The travel profile is transferred to the drive controller AS. The drive controller AS controls the drive elements of the machine tool WZM. The drive controller AS can be equipped with a frequency converter, in particular converter with a processor unit, such as a SINAMICS by Siemens AG.

The reference line S specifies how the tool W would be moved in an ideal situation, in order to manufacture the workpiece WS. On account of physical boundary conditions, such as possible inaccuracies or a speed limitation of the drive elements, the travel profile H is determined with the aid of the control device SE to take restrictions into account.

The travel profile H is calculated from the reference line S, the processing mode BA and the reference values MZ in the control unit SE.

According to the processing mode BA, the travel profile H is either calculated with the aid of a first alternative or a second alternative.

In the first alternative (with the method steps C), D) and E)), transformation curves K4, K5, K6 (see FIG. 2) are created from the reference line S with the aid of a development of the reference lines S with the aid of wavelet base functions WBF. The transformation curves K4, K5, K6 are modified to form modification curves K7, K8, K9 while adhering to the reference values MZ in the method step D). The modification curves K7, K9, K9 are either added in a last step and thus assembled to form the travel profile H or assembled with the aid of a wavelet transform, in particular a fast wavelet transform.

In a second alternative, the reference line S is mapped in a representation of points. The approximation curves K1, K2, K3 are generated from the points such that the approximation curves K1, K2, K3 are approximated with a reduced number of points, in each case.

The approximations of the points is performed with the aid of wavelet base functions WBF or with spline functions, in particular B-splines. The wavelet base functions WBF are produced from the processing mode BA provided. The transformation curves K4, K5, K6 are created from the approximation functions K1, K2, K3 with the aid of differentiation. The transformation curves K4, K5, K6 are smoothed and thus modified to form modification curves K7, K8, K9.

In a further step, the modification curves K7, K8, K9 are added to form the travel profile H. The travel profile H is therefore the sum of the modification curves K7, K8, K9. The hitherto calculated travel profiles H and/or the wavelet base functions WBF are stored in a storage device SP in the control device SE.

The control device SE can also be realized by a computing unit, where the computing unit transmits the travel profile H with the aid of an interface to the drive controller AS of the machine tool WZM.

Figure 2:
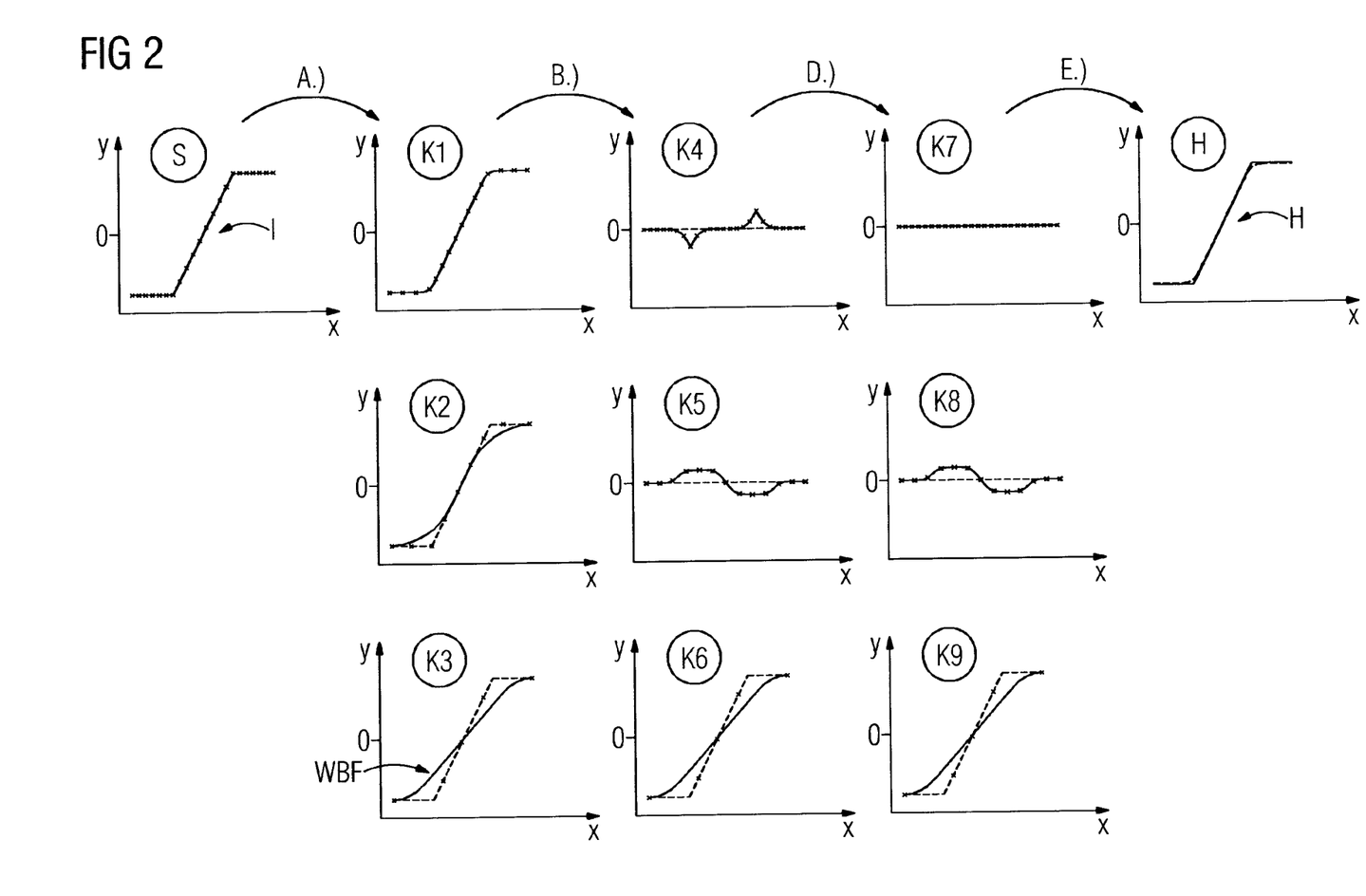
FIG. 2 shows a method for calculating a travel profile in accordance with the invention.

FIG. 2 shows a method for calculating a travel profile H. The starting point of the calculation is the reference line S, which maps a corner of the workpiece WS. The reference line S is represented by a plurality of points. In a first step A), a first approximation curve K1 is generated from the points by approximation of the total number of points of the reference line with an approximation function. A wavelet base function WBF is advantageously used as the approximation function.

A second approximation curve K2 is generated, by each second point in the representation of the reference line S being removed. The reduced quantity of points is likewise approximated. The same or another wavelet base function WBF can be used here. A third approximation curve K6 is generated, by in turn each second point being removed from the reduced quantity of points. The further reduced quantity of points is approximated in particular with a further wavelet base function WBF.

In a further method step B), a first transformation curve K4 is calculated from a difference between the second approximation curve K2 and the first approximation curve K1 (K4=K2−K1). A second transformation curve K5 corresponds to the difference between the third approximation curve K3 and the second approximation curve K2 (K5=K3−K2). The third transformation curve K6 corresponds to the third approximation curve K3.

In a further method step D), the transformation curves K4, K5, K6 will become modification curves K7, K8, K9 via modification based on the reference values MZ.

The modification is performed such that a region which the modification curves K7, K8, K9 are not permitted to leave is defined with the aid of the reference values MZ. If a transformation curve in one region is greater than the region, then this curve in the region is modified such that the transformation curve K4, K5, K6 returns to the region. The reference values correspond in particular to maximum deviations.

In the last step E), the modification curves K7, K8, K9 are added and the sum of the modification curves K7, K8, K9 forms the travel profile H.

Figure 3:
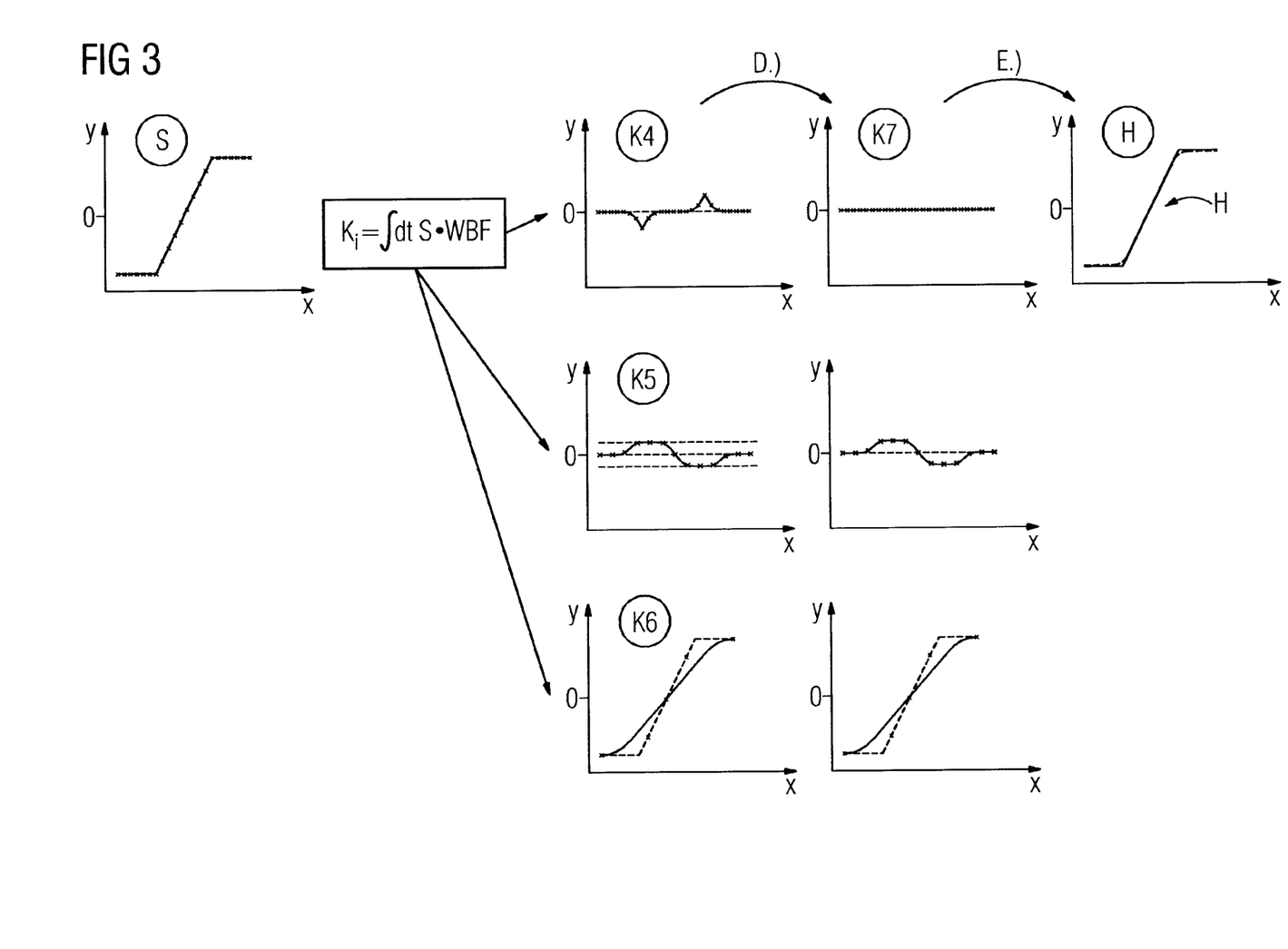
FIG. 3 shows an alternative method for calculating a travel profile in accordance with the invention.

FIG. 3 shows an alternative method for calculating a travel profile H. In the method shown here, the travel profile is calculated analogously to the method shown in FIG. 2, but the transformation curves K4, K5, K6 are, however, generated directly from the reference line S with the aid of a wavelet approximation.

The reference line S is transformed to form the transformation curves K4, K5, K6 with the aid of wavelet base functions WBF. B-splines are used advantageously as wavelet base functions WBF. The calculation of the first transformation curve K4 is accordingly performed by forming a scalar product of the reference line S with the first wavelet base function WBF. The second transformation curve K5 corresponds to the scalar product of the reference line S with the second wavelet base function WBF. The third transformation curve K6 corresponds to the scalar product of the reference line S with the third wavelet base function WBF. Moreover, the region that is embodied to be proportional to the reference values is shown in the second transformation curve K5. The point in the second transformation curve K5 that does not lie within the region is again disposed in the region in the second modification curve K8.

Figure 4:
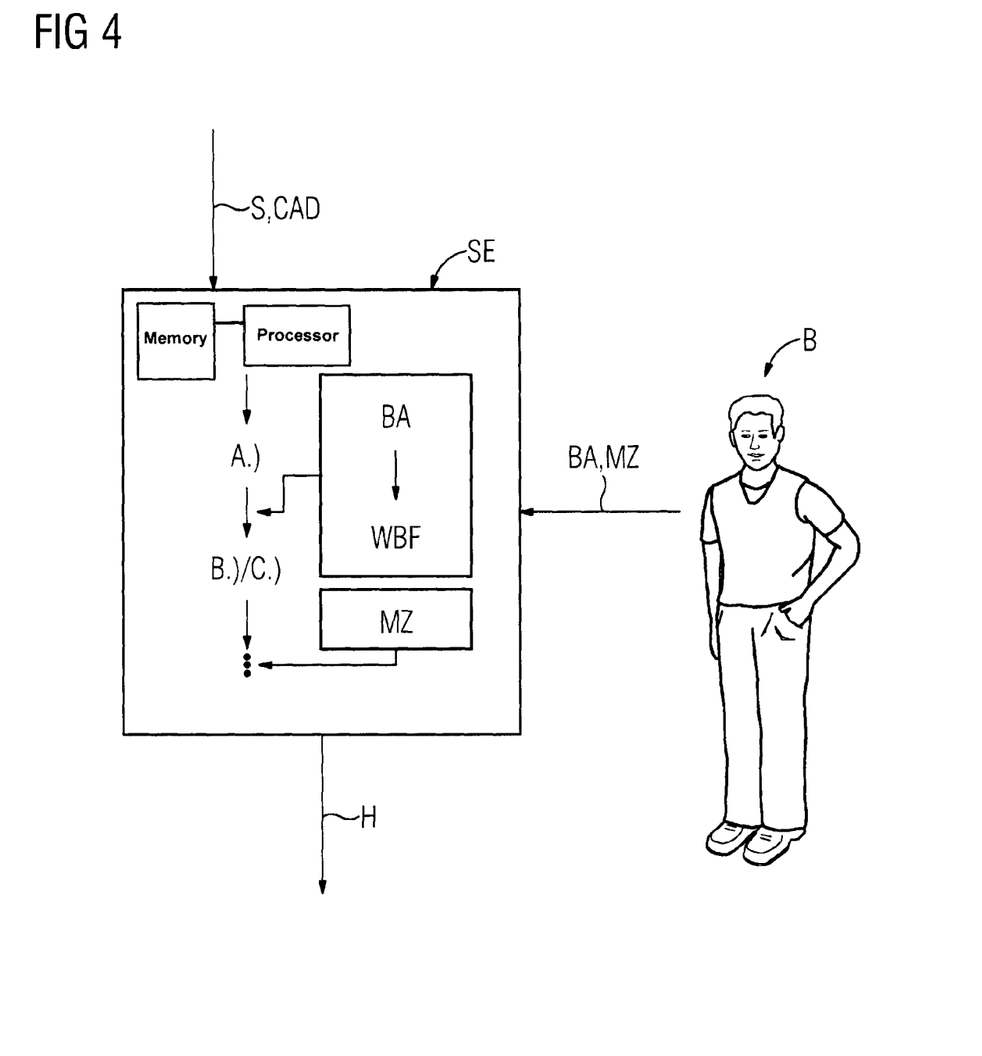
FIG. 4 shows a flow chart for calculating the travel profile in accordance with the invention.

FIG. 4 shows a flow chart for the calculation of the travel profile H. A user B who allows a travel profile H to be calculated to form a predetermined reference line S or a CAD file CAD is shown. The control device SE is used for calculation purposes. The user B specifies the processing type BA and optionally reference values MZ, in particular maximum deviations.

The control device SE assigns suitable wavelet base functions WBF for calculating the travel profile H to the processing mode BA predetermined by the user B. The wavelet base functions WBF are advantageously provided for both alternative calculation methods presented, here. Furthermore, the modification of the transformation curves K4, K5, K6 is introduced for the modification of the transformation curves K4, K5, K6 based on the predetermined reference values MZ. The reference values MZ can be assigned to the processing type BA. The reference values MZ can, however, also be predetermined or changed by the user B. The reference values recreate the permitted deviations from the dimensioning of the workpiece. The reference values can, however, also represent the physical boundary conditions of the machine tool WZM when the workpiece WS is manufactured.

Maximum speeds of the drive elements of the machine tool WZM, a cut resistance of the material of the workpiece WS or a predetermined processing time are considered to be physical boundary conditions.

Milling (2D and 3D), in particular as prismatic manufacture, laser processing, in particular trimming, lasering, laser cutting or rotating, scaling, smoothing are considered to be processing modes.

A travel profile can advantageously be calculated via the invention, where the processing mode provided is noted.

Figure 5:
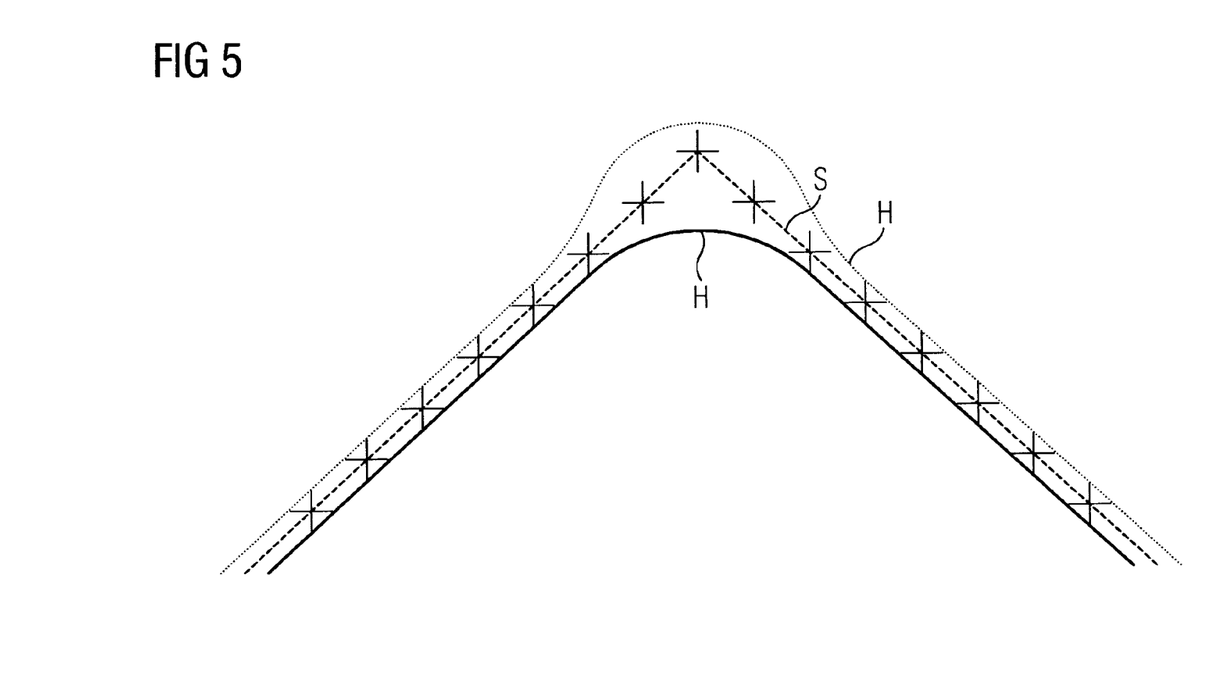
FIG. 5 shows two travel profiles and a reference line in accordance with the invention.

FIG. 5 shows two travel profiles H and a reference line S. The reference line S is shown by a dashed line and by crosses shown spaced apart on the dashed line. The crosses symbolize the points, on the basis of which the approximation curves K1, K2, K3 are approximated.

Furthermore, a travel profile H is shown, in which the tool W does not entirely penetrate the corner shown. This travel profile H can represent the travel profile H of a rough processing mode BA with a CNC machine. The other travel profile H extends beyond the reference line S. Such a travel profile H is suitable, for instance, for guiding a tool W, which cuts out a corner in a rapid manner. The more accurate the manufacture, i.e., the smaller the maximum deviations when the workpiece W is processed, the smaller the distance of the travel profile H from the reference line S.

In summary, the invention relates to a method for providing a travel profile H and a control device SE and a machine (tool) WZM with such a control device SE. A computer program can also be provided to provide the travel profile H. A reference line S is generated, e.g., from a CAD drawing, in order to provide a travel profile H for a tool W. Approximation curves K1, K2, K3 are created from the reference line S with the aid of wavelet base functions WBF. Transformation curves K4, K5, K6 are formed from the approximation curves K1, K2, K3 by differentiation, and these are each adjusted to a desired accuracy of the processing mode BA via modification. Modification curves K7, K8, K9 are produced via modification of the transformation curves K4, K5, K6. The travel profile H is the sum of the modification curves K7, K8, K9. Drive elements of the machine tool WZM are controlled based on the travel profile H. Particularly advantageously, the provision of the travel profile (H) can be optimized via the selection of wavelet base functions (WBF) on the basis of the processing mode BA, e.g., rough milling, fine milling, or laser cutting.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing a travel profile, the method comprising:
   predetermining a reference line; and
   defining the reference line based on points at an edge or a corner of a workpiece which extend orthogonally to the edge of the workpiece, the method further comprising performing one of (i) steps A), B), D) E) and F) and (ii) step C), D), E) and F) comprising:
   A) creating n approximation curves, the n approximation curves being created via an approximation based on at least one of (i) a different number and (ii) position of points comprising points from the reference line;
   B) creating n transformation curves, each of the n transformation curves being generated by differentiation between in each case two of the n approximation curves;
   C) creating n transformation curves via wavelet approximations of the reference line with wavelet base functions;
   D) creating n modification curves, a j'th (j=1 . . . n) modification curve being generated from a j'th transformation curve via one of (i) omitting each i'th point in the (j−1)'th approximation curve and (ii) a modification process;
   E) creating the travel profile by adding the n modification curves; and
   F) moving a tool along a path defined by the created travel profile during processing of a workpiece.

2. The method as claimed in claim 1, wherein at least one of (i) the approximation curves and (ii) the transformation curves are wavelet base functions of a wavelet transform.

3. The method as claimed in claim 1, wherein the modification process is performed via a smoothing based on a reference value.

4. The method as claimed in claim 2, wherein the modification process is performed via a smoothing based on a reference value.

5. The method as claimed in claim 1, wherein the wavelet base functions are predetermined based on a processing mode.

6. The method as claimed in claim 1, wherein the j'th approximation curve is generated by omitting each second point in the (j−1)'th approximation curve.

7. The method as claimed in claim 1, wherein the approximation curves result from an approximation of the points by polynomials.

8. The method as claimed in claim 7, wherein the polynomials are B-splines.

9. The method as claimed in claim 1, wherein the j'th transformation curve is formed from a difference between the (k+2)'th approximation curve and the (k+1)'th approximation curve.

10. The method as claimed in claim 5, wherein reference values are predetermined based on the processing mode.

11. The method as claimed in claim 1, wherein the travel profile comprises a travel profile of a tool in a machine tool.

12. A control device for providing a travel profile, comprising:
a processor; and
memory;
wherein at least one of (i) a reference line, (ii) support points and (iii) a G-code program are provided as input variables, the control device being configured to:
predetermine a reference line; and
define the reference line based on points at an edge or a corner of a workpiece which extend orthogonally to the edge of the workpiece, the control device being further configured to perform one of (i) A), B), D), E) and F) and (ii) C), D), E) and F comprising:
A) creating n approximation curves, the n approximation curves being created via an approximation based on at least one of (i) a different number and (ii) position of points comprising points from the reference line;
B) creating n transformation curves, each of the n transformation curves being generated by differentiation between in each case two of the n approximation curves;
C) creating n transformation curves via wavelet approximations of the reference line with wavelet base functions;
D) creating n modification curves, a j'th (j=1 . . . n) modification curve being generated from a j'th transformation curve via one of (i) omitting each i'th point in the (j−1)'th approximation curve and (ii) a modification process;
E) creating the travel profile by adding the n modification curves; and F) moving a tool along a path defined by the created travel profile during processing of a workpiece.

13. The control device as claimed in claim 12, wherein the travel profile is provided to control drive elements in a machine tool.

14. The control device of claim 12, wherein the control device controls a machine tool.

15. A machine having the control device as claimed in claim 12.

16. The machine as claimed in claim 15, wherein the machine comprises a machine tool.

17. A control device comprising:
a processor; and
memory;
wherein the control device is encoded with a computer program which, when executed by a processor, causes the control device to provide a travel profile, the computer program comprising:
program code for predetermining a reference; and
program code for defining the reference line based on points at an edge or a corner of a workpiece which extend orthogonally to the edge of the workpiece, the computer program further comprising program code for performing one of (i) A), B), D), E) and F and (ii) C), D), E) and F) comprising:
A) program code for creating n approximation curves, the n approximation curves being created via an approximation based on at least one of (i) a different number and (ii) position of points comprising points from the reference line;
B) program code for creating n transformation curves, each of the n transformation curves being generated by differentiation between in each case two of the n approximation curves;
C) program code for creating n transformation curves via wavelet approximations of the reference line with wavelet base functions;
D) program code for creating n modification curves, a j'th (j=1 . . . n) modification curve being generated from a j'th transformation curve via one of (i) omitting each i'th point in the (j−1)'th approximation curve and (ii) a modification process;
E) program code for creating the travel profile by adding the n modification curves; and
F) program code for moving a tool along a path defined by the created travel profile during processing of a workpiece.

* * * * *